(12) United States Patent
Wirola et al.

(10) Patent No.: US 10,972,873 B2
(45) Date of Patent: Apr. 6, 2021

(54) ENHANCING THE ACCURACY FOR DEVICE LOCALIZATION

(71) Applicant: HERE GLOBAL B.V., Eindhoven (NL)

(72) Inventors: Lauri Aarne Johannes Wirola, Tampere (FI); Henri Jaakko Julius Nurminen, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/717,337

(22) Filed: Dec. 17, 2019

(65) Prior Publication Data

US 2020/0196104 A1    Jun. 18, 2020

(30) Foreign Application Priority Data

Dec. 17, 2018   (EP) .................................... 18212851

(51) Int. Cl.
    *H04W 4/029*    (2018.01)
    *G10L 15/26*    (2006.01)
    (Continued)

(52) U.S. Cl.
    CPC .......... *H04W 4/029* (2018.02); *G01C 21/005* (2013.01); *G01S 19/45* (2013.01); *G10L 15/22* (2013.01);
    (Continued)

(58) Field of Classification Search
    CPC ..... H04W 4/029; H04W 4/024; H04W 4/021; H04W 88/02; G10L 15/26; G10L 15/22;
    (Continued)

(56) References Cited

U.S. PATENT DOCUMENTS 9,361,889 B2   6/2016   Chao et al.
9,640,199 B2   5/2017   Parkinson et al.
(Continued)

FOREIGN PATENT DOCUMENTS

WO    WO 97/50002 A1      12/1997
WO    WO 2012/172160 A1   12/2012

OTHER PUBLICATIONS

Extended European Search Report for Application No. EP 18 21 2851 dated Jul. 9, 2019, 9 pages.
(Continued)

*Primary Examiner* — Michael Y Mapa
(74) *Attorney, Agent, or Firm* — Alston & Bird LLP

(57) ABSTRACT

Inter-alia, a method is disclosed comprising: determining or triggering a determination of a coarse position estimate based on GNSS-based and/or non-GNSS-based positioning; obtaining user input information indicative of one or more inputs a user has entered into a mobile device; analyzing the user input information for forming one or more pieces of location indication information; comparing the coarse position estimate with the one or more pieces of location indication information; and in case a respective location indication information matches or is in the vicinity of the coarse position estimate: determining a position estimate to represent or comprise the position of the respective location indication information. It is further disclosed an according apparatus, computer program and system.

20 Claims, 6 Drawing Sheets

(51) Int. Cl.
| | |
|---|---|
| *H04W 4/024* | (2018.01) |
| *G01C 21/00* | (2006.01) |
| *G01S 19/45* | (2010.01) |
| *G10L 15/22* | (2006.01) |
| *H04W 4/021* | (2018.01) |
| *H04W 88/02* | (2009.01) |

(52) U.S. Cl.
 CPC ............. *G10L 15/26* (2013.01); *H04W 4/021* (2013.01); *H04W 4/024* (2018.02); *G10L 2015/223* (2013.01); *H04W 88/02* (2013.01)

(58) Field of Classification Search
 CPC .. G10L 2015/223; G01C 21/005; G01S 19/45
 USPC ............................................. 455/456.1–457
 See application file for complete search history.

(56) References Cited

U.S. PATENT DOCUMENTS

| | | | |
|---|---|---|---|
| 9,644,985 B2 | 5/2017 | Takei et al. | |
| 9,702,711 B2 | 7/2017 | Tang et al. | |
| 2010/0185391 A1* | 7/2010 | Lee | G06F 16/9537 |
| | | | 701/532 |
| 2010/0191520 A1 | 7/2010 | Gruhn et al. | |
| 2013/0045751 A1* | 2/2013 | Chao | G01S 5/16 |
| | | | 455/456.1 |
| 2014/0214427 A1* | 7/2014 | Chao | G10L 15/30 |
| | | | 704/270.1 |

OTHER PUBLICATIONS

Taguchi, R. et al., *Learning Place-Names From Spoken Utterances and Localization Results by Mobile Robot*, Proceeding of the Annual Conference of the International Speech Communication Association, INTERSPEECH 2011 (2011) 4 pages.

\* cited by examiner

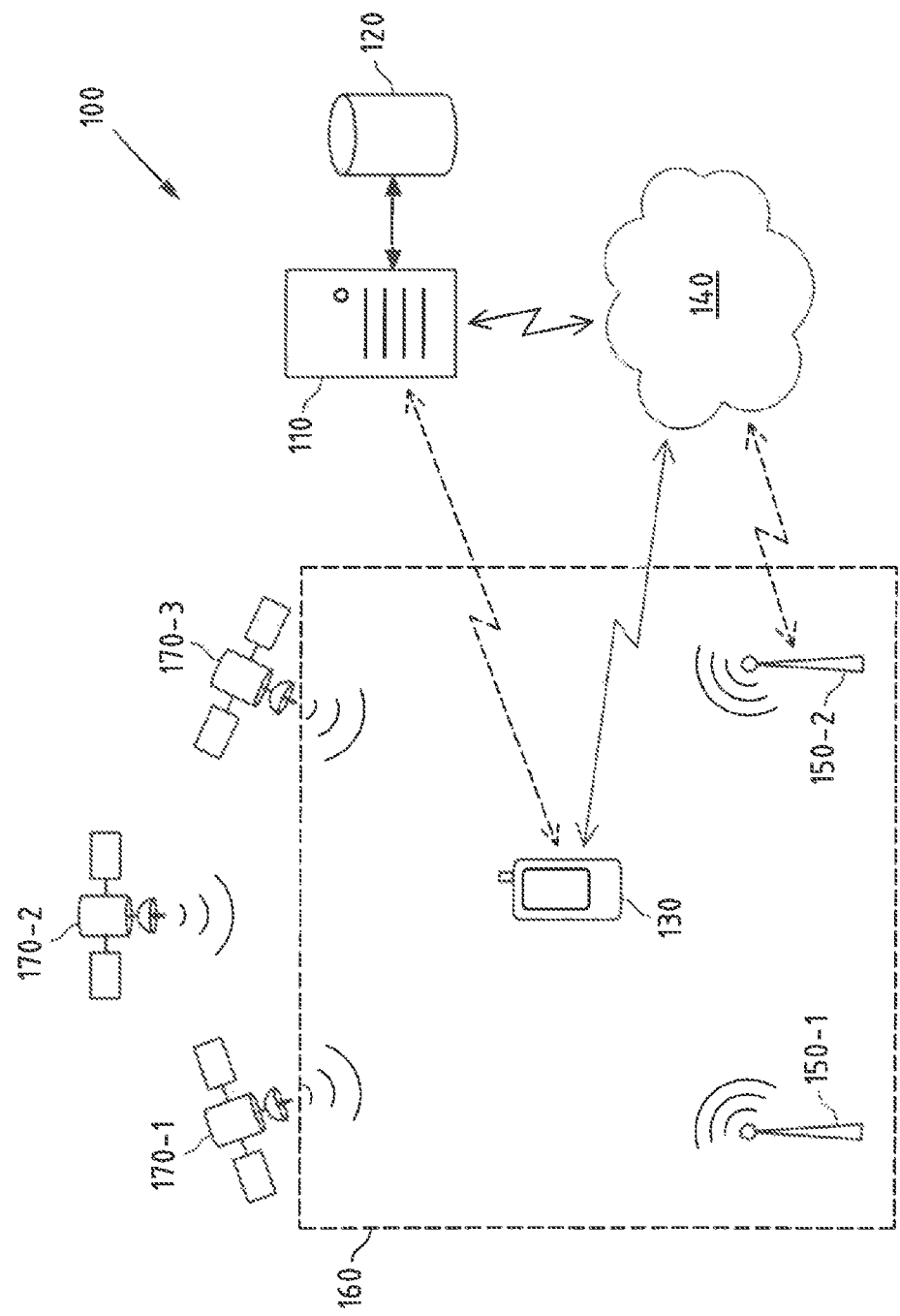

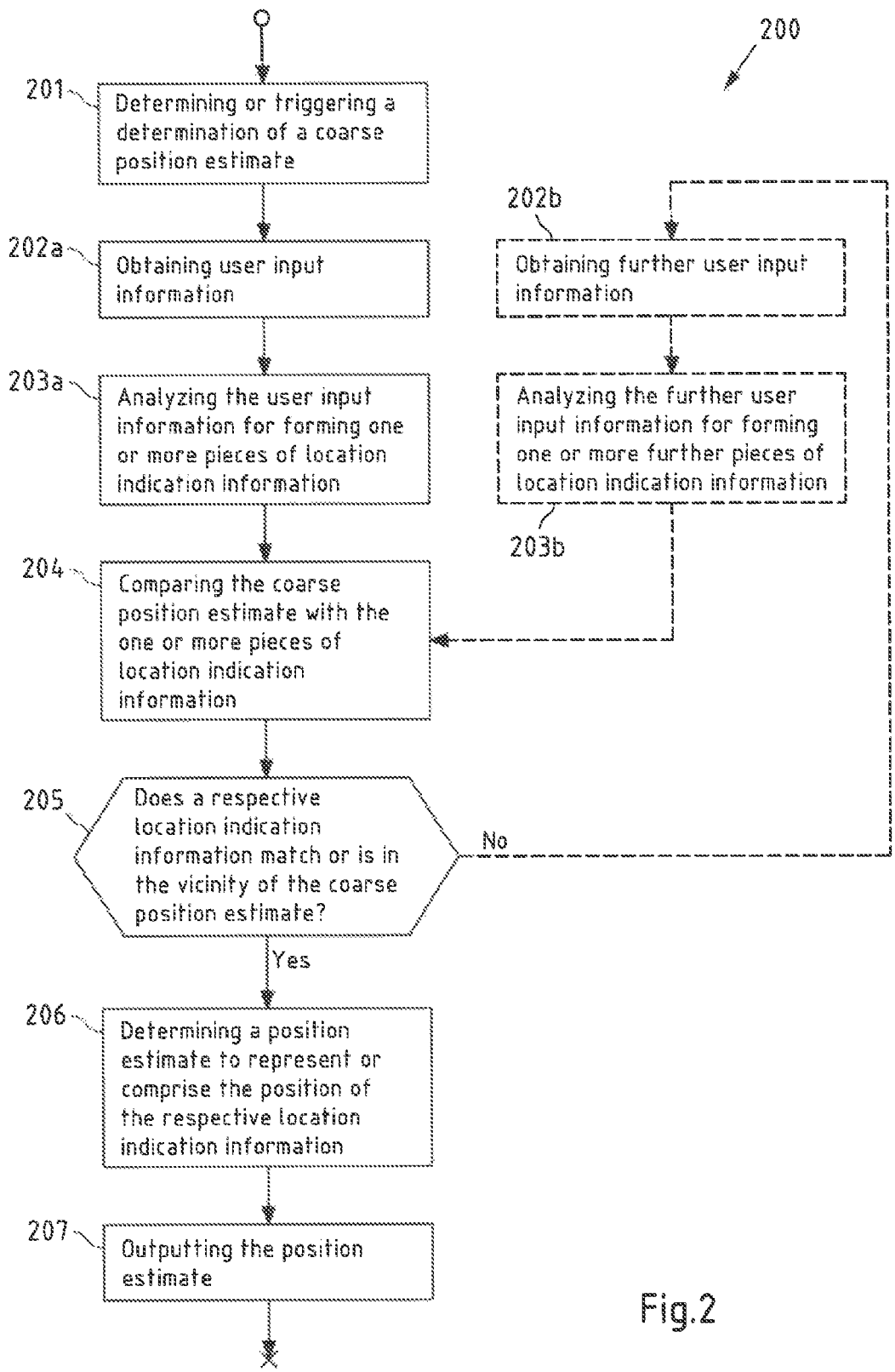

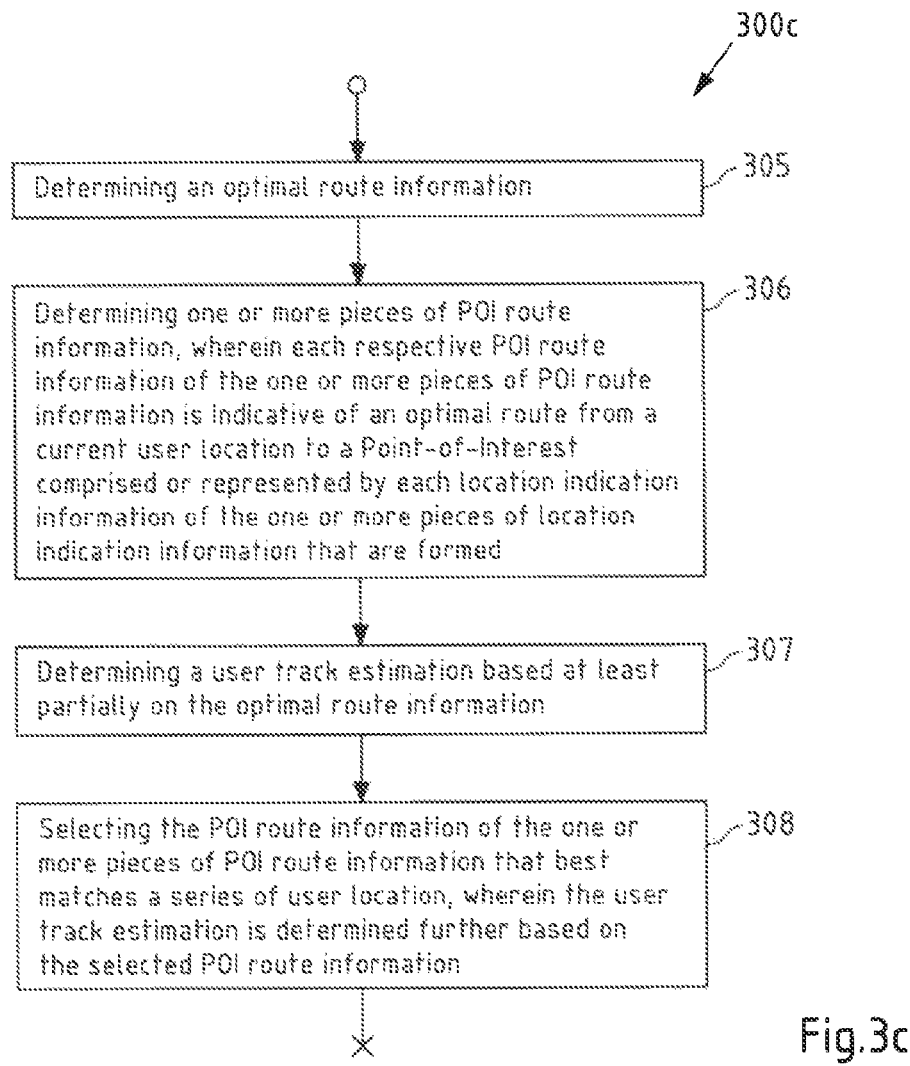

ENHANCING THE ACCURACY FOR DEVICE LOCALIZATION

CROSS-REFERENCE TO RELATED APPLICATIONS

This application claims priority to European Patent Application No. 18212851.2, filed Dec. 17, 2018, the entire contents of which are incorporated herein by reference.

FIELD

The following disclosure relates to the field of positioning, or more particularly relates to systems, apparatuses, and methods for enhancing the accuracy for device localization.

BACKGROUND

Modern global cellular (GSM (Global System for Mobile Communications), CDMA (Code Division Multiple Access), WDCMA (Wideband CDMA), TD-SCDMA (Time Division Synchronous CDMA), LTE (Longterm Evolution), LTE-A (LTE Advanced), NB-IoT (NarrowBand-Internet-of-Things)) and non-cellular (primarily WLAN (Wireless Local Area Network), but also BT (Bluetooth), BLE (Bluetooth Low Energy), ZigBee, LoRa, to name but a few non-limiting examples) positioning technologies are based on collecting large global databases containing information on the cellular and non-cellular signals. A large portion of the data typically originates from the users of these positioning technologies.

The data from the users is typically in the form of fingerprints respectively fingerprint information. Such fingerprints contain GNSS (Global Navigation Satellite System)-based or WLAN-based position estimate and measurements taken from the radio interfaces (cellular, non-cellular).

The measurements contain e.g.:
Global and/or Local IDs of the cellular network cells observed, and, optionally,
signal strength and/or pathloss estimates;
timing measurements (Timing Advance or Round-Trip Time).
BSSIDs (Basic Service Set Identifiers) (MAC (Medium Access Control) address of the air interface) of the WLAN access points observed and, optionally,
SSIDs (Service Set Identifiers);
signal strengths (RSSI (received signal strength index), physical Rx level in dBm ref 1 mW, etc.)
timing measurements (Round-trip Time).

This data gets uploaded to the server or server cloud, where generating of models of wireless communication nodes for positioning purposes based on the fingerprints received from the multitude of the users takes place. Such models may be coverage areas, node positions, radio propagation models, Rx fields, etc. In the end, these models are transferred back to the user terminals for use in position determination.

Although the end user terminal has GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors and in urban canyons, which are generally challenging environments for GNSS-based technologies.

The positioning can function in two modes. The first mode is the terminal-assisted mode, in which the terminal performs the measurements of the cellular and/or non-cellular air interface, provides the measurements to the remote server, which in turn provides the position estimate back to the device.

The second mode is the terminal-based mode, in which the device has a local copy of the radio map (or most likely, a subset of the global radio map). Such a subset can be downloaded by the device from a remote server for the (geographic) area of interest (e.g. a small area around the current location, or for a whole country, to name but a few non-limiting examples) out of a global radio map comprised a plurality of such subsets. Such a subset can further be pre-installed to the device in the factory, but even in that case the data needs to be refreshed at some point.

It is known for resolving location indoors to rely on fusion of GPS (Global Positioning System) and sensor data. These solutions extend location estimation to GNSS-denied areas based on the sensor data. Other approaches rely on probes collected outdoors, in order to localize probes located indoors (probes collected outdoors and indoors contain same WiFi access point(s) and can, thus, be related to each other.

SUMMARY OF SOME EXEMPLARY EMBODIMENTS

While location references for probe data can be easily obtained outdoors, e.g. from GNSS, obtaining location references indoors is still a big challenge. Because GPS does not work indoors in general, sensor-based solutions quickly diverge in the absence of GPS fixes (lack of absolute location reference). Therefore, any additional source of location information indoors is of great use for crowd-sourcing-based positioning systems.

It is thus, inter alia, an object of the invention to achieve an enhanced accuracy for determining a position estimate, in particular to provide a more accurate position estimate.

According to a first exemplary aspect of the present invention, a method is disclosed, the method comprising:
determining or triggering a determination of a coarse position estimate based on GNSS (Global Navigation Satellite System)-based and/or non-GNSS-based positioning;
obtaining user input information indicative of one or more inputs a user has entered into a mobile device;
analyzing the user input information for forming one or more pieces of location indication information, wherein a respective location indication information is indicative of an identifier of a certain location;
comparing the coarse position estimate with the one or more pieces of location indication information; and
in case a respective location indication information matches or is in the vicinity of the coarse position estimate:
determining a position estimate to represent or comprise the position of the respective location indication information.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by a mobile device, e.g. a mobile terminal. For instance, the method may be performed and/or controlled by using at least one processor of the mobile device. Alternatively, this method may be performed and/or controlled by a module comprised by or connectable to the server, the server cloud, or to the mobile device.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:

at least one apparatus according to any aspect of the invention as disclosed above, and a further apparatus (e.g. a server of a server cloud), wherein the further apparatus is configured to be triggered to determine a coarse position estimate.

In the following, exemplary features and exemplary embodiments of all aspects of the present invention will be described in further detail.

A coarse position estimate is determined, e.g. by the at least one apparatus performing and/or controlling the method according to the first exemplary aspect of the present invention. Alternatively, the coarse position estimate is triggered to be determined. In the latter case, the coarse position estimate may for instance be determined by a server or a server cloud, e.g. a positioning server, e.g. based on a request that is received. Thus, e.g. the server or the server cloud is triggered to determine the coarse position estimate. The coarse position estimate may for instance be indicative of or represent an estimation of a position at which a device (e.g. a mobile device) whose position is to be determined is located. The coarse position estimate may for instance comprise or represent a pair of coordinates, e.g. latitude- and longitude coordinates or x-, and y- coordinates. Alternatively, the coarse position estimate may for instance comprise or represent three-dimensional coordinates, e.g. latitude-, longitude- and altitude-coordinates, or x-, y- and z-coordinates.

According to an exemplary embodiment of all exemplary aspects of the present invention, the coarse position information is determined at least partially based on sensor-based measurements, in particular based on GPS sensor-based and/or radio-based measurements.

The coarse position estimate is determined or triggered to be determined based on GNSS (Global Navigation Satellite System)-based and/or non-GNSS-based positioning. Examples for GNSS-based positioning are GPS, GALILEO, GLONASS (Globalnaja nawigazionnaja sputnikowaja sistema), and examples for non-GNSS-based positioning are fingerprinting based on radio signals sent by e.g. BT/BLE beacons and/or WLAN access points, to name but a few non-limiting examples.

The coarse position estimate of the mobile device may for example indicate a pre-determined area covering the (e.g. absolute) position of the mobile device, but may not indicate the specific, thus more accurate, (e.g. absolute) position of the mobile device. For example, the pre-determined area may be part of a plurality of pre-determined areas for each of which it is pre-determined whether or not it is part of the vicinity of the pre-determined venue, to name but one non-limiting example. Accordingly, the vicinity of the pre-determined venue may be defined by a pre-determined area or a combination of pre-determined areas covering the entire pre-determined venue. The GNSS-based and/or the non-GNSS-based positioning may for instance use one or more measurements of radio signals or radio signal parameters to be considered. Each of those measurements may for instance be considered to be indicative of whether or not the mobile device was located in the vicinity of the pre-determined venue when the respective radio signals and/or radio signal parameters were gathered (e.g. measured or captured). For example, the mobile device may be considered to be in the vicinity of the pre-determined venue, if the respective radio signals and/or radio signal parameters represented by the one or more measurements indicate a pre-determined area at least partially defining the vicinity of the pre-determined venue.

The user input information indicative of one or more inputs a user has entered into the mobile device may for instance be obtained by receiving the user input information, e.g. (directly) from the mobile device, or from another entity that is different from the mobile device, which relays the user input information to the apparatus performing and/or controlling the method according to the first exemplary aspect of the present invention. For instance, in case the apparatus performing and/or controlling the method according to the first exemplary aspect of the present invention is a mobile device, the user input information may for instance be obtained by monitoring one or more inputs a user has entered into this mobile device and forming a user input information subsequently. Further, for instance, in case the apparatus performing and/or controlling the method according to the first exemplary aspect of the present invention is a mobile device, in a first step the apparatus determines a coarse position estimate. Parallel to or subsequent to this determination of the coarse position estimate, a respective user input information is obtained by the apparatus (e.g. the mobile device) performing and/or controlling the method according to the first exemplary aspect of the present invention.

The mobile device may for instance be portable (e.g. weigh less than 5, 4, 3, 2, or 1 kg). The mobile device may for instance comprise or be connectable to a display for displaying information, e.g. a route that is guided/navigated to a user, to name but one non-limiting example. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS receiver. The mobile device may for instance comprise to be connectable to one or more sensors, e.g. in the form of an accelerometer and/or a gyroscope for gathering (e.g. measuring) further information. The mobile device may for instance comprise or be connectable to a receiver and/or a transmitter (e.g. a transceiver) for receiving and/or sending information. For instance, the mobile device may comprise one or more radio receivers (e.g. radio transceivers) to gather measurements based on GNSS- or non-GNSS-based positioning signals, which may for instance enable a coarse position estimate indicative of the devices position to be determined or triggered to be determined. The mobile device may for instance be suitable for outdoor and/or indoor navigation respectively positioning. The mobile device may for instance comprise various other components like a user interface for receiving user input.

The user input information is analyzed for forming (e.g. extracting) one or more pieces of location indication information out of the user input information. A respective location indication information is indicative of an identifier of a certain location. Such an identifier of a certain location may for instance be a Point-of-Interest (POI). Such a POI may for instance be defined by its name, its address, its coordinates, or the like, to name but a few non-limiting examples.

The extracting of the one or more pieces of location indication information out of the user input information may be performed automatically and/or repeatedly (e.g. periodically and/or continuously and/or for a pre-determined period of time). In this way, the user input information may for instance be updated or expanded by more actual (e.g. up-to-date) input the user has entered into his mobile device.

The one or more pieces of location indication information may for instance be stored, e.g. in a memory. Such a memory may for instance comprise a database. The memory may for instance be comprised by or be connectable to the apparatus performing and/or controlling the method according to the first exemplary aspect of the present invention. Then, the one or more pieces of location indication information may for instance be used in the future, e.g. for comparing the coarse position estimate with the one or more pieces of location indication information. Further, the one or more pieces of location indication information stored in the memory may for instance be associated with (e.g. linked to) a respective mobile device, e.g. via an identifier of the respective electronic device. In this way, the formed one or more pieces of location indication information can be kept (e.g. stored) in a personalized way, e.g. to determine typical patterns of the user.

The coarse position estimate is compared with the (formed) one or more pieces of location indication information. For instance, it may be checked whether or not the determined or triggered to be determined coarse position estimate is within the vicinity (e.g. a pre-defined or defined according to pre-defined rules radius, e.g. radius of 10 m, 20 m, 30 m, 40 m, 50 m, or more) e.g. of one or more POIs, or publically known venues (e.g. shopping malls, office buildings, stations, airports, universities, or the like) as represented by the one or more pieces of location indication information.

Then, in case a respective location indication information matches or is in the vicinity of the coarse position estimate, the position estimate is determined. This position estimate can be assumed to be more accurate than the coarse position estimate, since due to the comparison of the one or more pieces of location indication information formed out of the user input information with the coarse position estimate, it can be assumed that the user respectively this mobile device is located e.g. at the POI or publically known venue. Further, since the precise location of the respective POI or the publically known venue is known, the position estimate is determined to represent or comprise the position of the respective location indication information (e.g. a certain POI or publically known venue) that matches or is in the vicinity of the respective location indication information.

According to an exemplary embodiment of all exemplary aspects of the present invention, the method further comprises:
outputting the (determined) position estimate.

The determined position estimate is output, e.g. to the entity from which e.g. a request to determine its position stems. Such a request may for instance be obtained (e.g. received) prior to the step of determining or triggering a determination of the coarse position estimate. Alternatively, the position estimate may for instance be output to another entity that is different from the entity e.g. from which the obtained request stems, and which transmits (e.g. relays) the position estimate to the entity from which the obtained request stems. The position estimate may for instance be output via a communication interface of the apparatus performing and/or controlling the method according to the first exemplary aspect of the present invention. Such a communication interface may for instance comprise one or more radio transceiver (e.g. transmitter and receiver), e.g. according to WLAN, BT, BLE, cellular, or a combination thereof communication standard, to name but a few non-limiting examples.

According to an exemplary embodiment of all exemplary aspects of the present invention, the comparing further comprises:
determining a time difference between a first time at which the user input information was gathered prior to the obtaining of the user input information and a second time at which the comparing is performed, and wherein the position estimate is determined to represent or comprise the position of the respective location indication information (e.g. only) in case the time difference is equal or smaller than a pre-defined amount of time.

The pre-defined amount of time may for instance be set to be 10 minutes or less, to name but one non-limiting example. In this way, it is ensured that the determined position estimate comprises or represents a position which is very close to the actual position of the user respectively the mobile device of the user since the likelihood that the user has significantly moved after the user input was gathered by the mobile device (based on which the accuracy of the position determined is enhanced) decrease with the shortening of the time difference. Thus, a certain degree of actuality can be enabled.

According to an exemplary embodiment of all exemplary aspects of the present invention, in case a respective location indication information does not match or is not in the vicinity of the coarse position estimate, the method further comprises:

obtaining further user input information; and
analyzing the further user input for forming one or more further pieces of location indication information, wherein the comparison is based on the coarse position estimate and the one or more further pieces of location indication information.

For instance, if the coarse position estimate does not match or is in the vicinity of a respective location indication information, or vice versa, it may for instance be continued with obtaining further user input information. Obtaining further user information may for instance be an optional step comprised by the method according to the first exemplary aspect of the present invention. The further user input information may for instance be obtained in the same way as the user input information. Then, those further user input information may be analyzed in the same way as already performed with the user input information, wherein after the further user input information are analyzed and e.g. one or more further pieces of location indication information are formed, those can be used for the comparison. Thus, the comparison may for instance be at least partially based on the one or more further pieces of location indication information, in case further user input information are obtained and analyzed, as described above.

In case the analyzing may not have led to the forming of one or more further pieces of location indication information, it will be understood that the step of obtaining further user input information, and the step of analyzing may be performed and/or controlled (e.g. executed) another or multiple times, until (i) one or more pieces of location indication information are formed, and/or (ii) the comparison which is performed and/or controlled (e.g. executed) at least partially based on the one or more further pieces of location indication has led to a result that the coarse position estimate matches or is in the vicinity of at least one of the formed one or more further pieces of location indication information.

According to an exemplary embodiment of all exemplary aspects of the present invention, the user input information or the user input information and the further user input information are continuously gathered (e.g. prior to the obtaining of the user input information and/or the further user input information).

For instance, all or most of inputs the user has entered, e.g. via text and/or voice, into his mobile device may be gathered. Alternatively, e.g. only in case the user has given his consent to such a continuously gathering of inputs the user has entered into his mobile device may enable such a continuous gathering. Further, the user may for instance withdraw his consent any time, e.g. by another input into his mobile device. Alternatively, e.g. immediately prior to the gathering, another input may be gathered (e.g. registered) at the mobile device of the user, with which the user may have indicated that a following input, e.g. via text and/or voice, may for instance be gathered accordingly. For instance, the user may be prompted to enter the one or more inputs. e.g. via a microphone and/or via a keyboard or touchscreen of the mobile device, to name but a few non-limiting examples.

Additionally or alternatively, the one or more inputs of the user into his mobile device may be gathered continuously by e.g. steadily, or for the amount of a certain pre-defined or defined according to pre-defined rules time interval gathering such inputs, to name but a few non-limiting examples.

According to an exemplary embodiment of all exemplary aspects of the present invention, the user input information or the user input information and the further user input information are gathered by the mobile device, in particular by a microphone or an input device (e.g. a keyboard, or a touchscreen, to name but a few non-limiting examples) comprised by or connectable to the mobile device.

The user may for instance enter the one or more inputs, e.g. via the microphone and/or via the keyboard or touchscreen comprised by or connectable to the mobile device, to name but a few non-limiting examples.

With the keyboard or touchscreen of the mobile device, the user may for instance enter user input information representing text. With the microphone of the mobile device, the user may for instance enter user input information representing voice respective speech. Such a user input information may thus comprise or represent a speech information indicative of a user input via voice/speech.

According to an exemplary embodiment of all exemplary aspects of the present invention, the analyzing of the user input information further comprises:

transforming a speech information indicative of a user input via voice comprised or represented by the user input information or by the user input information and the further user input information into text, if necessary; and
searching for one or more patterns indicative of location identifiers and if successful, forming one or more found location identifiers into the one or more pieces of location indication information.

The text respectively the transformed speech information may for instance comprise or represent one or more strings, e.g. comprising interpretable text. The one or more strings may for instance be indicative of text in a certain language. In this way, it is enabled to process multilingual speech respectively text.

The one or more patterns may for instance be comprised by a set of patterns. Such a set of patterns may for instance be pre-defined. Such a set of patterns may for instance be stored in a memory, e.g. a database. In such a set of patterns, there may for instance be comprised or represented such patterns as:

"I/We am/are in/at/on . . . now";
"I/We am/are in/at/on . . . ";

to name but a few non-limiting examples indicative of the user input information respectively the further user input information comprising or representing location indication information due to the indication of a respective pattern.

It will be understood that such a set of patterns may for instance comprise much more of such patterns indicating a location to be comprised or represented by the user input information respectively the further user input information. Additionally, a respective set of patterns may be associated with a certain language. For instance, a first set of patterns may be for the German language, a second set of patterns may be for the English language, a third set of patterns may be for the Spanish language, and so on.

In order to form a respective location indication information, it may for instance be extracted a sub-string following the "in/at/on" indicator as comprised or represented by the user input information respectively the further user input information, to name but one non-limiting example.

Further, e.g. NLP (Natural Language Processing) methods may for instance be utilized in order to extract a location for forming a respective location indication information at least partially based on the user input information respectively the further user input information. Such NLP methods may for instance be directed towards a detection of location context, and/or corresponding location names out of a user input information, as used within the meaning of the present invention.

According to an exemplary embodiment of all exemplary aspects of the present invention, the forming of the one or more pieces of location indication information further comprises:

comparing a list of one or more Point-Of-Interest names, wherein the one or more Point-Of-Interests are located nearby the coarse position estimate, with the obtained user input information or with the obtained user input information and the obtained further user input information; and selecting the one or more Point-Of-Interest names of the list that match the one or more identifiers of one or more respective certain locations to be formed into the one or more pieces of location indication information.

The list may for instance be stored in a memory, e.g. a database. The list may for instance be obtained from a database, e.g. a public accessible database. Such a public accessible database may for instance be accessible via the Internet. For instance, several service providers do provide such lists comprising one or more Point-Of-Interest names and/or Point-of-Interest locations.

For instance, the comparison may be performed and/or controlled by comparing e.g. location names as comprised or represented by a respective location indication information of the one or more (e.g. further) pieces of location indication information with the respective Point-Of-Interest name of the multiple of Point-Of-Interest names as comprised or represented by the list. A result of such a comparison may for instance be a list of probabilities that a respective location name of a respective location indication information represents a respective Point-Of-Interest name.

Further, if e.g. a string representing a respective Point-Of-Interest name and another string represented by a respective location indication information completely match, and optionally may be sufficiently long (e.g. more than 3 characters, to name but one non-limiting example) and further optionally, unique, then the probability can be equal to 1. If, however, the strings do not match (e.g. at all), and optionally are not sufficiently long, and further optionally, are not unique, then the probability can be equal to 0. It will be understood that there may also be intermediate case between the two aforementioned cases with a probability of 1 and another probability of 0. For instance, such an intermediate case may be when one short variant of the other is determined during the comparison, e.g. "Mac" and "MacDonald", in which case the probability may be between 0 and 1, not equaling 0 or 1.

Then, e.g. those one or more Point-Of-Interest names of the list that match the one or more identifiers of one or more respective certain locations are selected to be formed into the one or more pieces of location indication information.

According to an exemplary embodiment of all exemplary aspects of the present invention, at least one of the one or more pieces of location indication information comprises or represents a route destination information indicative of a final destination the user is navigated to.

An intended final destination of the user may for instance be represented or comprised by a respective location indication information. For instance, when speech respectively text entered by the user into his mobile device, and represented by a respective user input information respectively a further user input information, represents such a route destination information, then e.g. a most probable route or multiple probable routes from a current location of the user (e.g. represented or comprised by the coarse position estimate) can be determined.

For instance, the intended final destination information may be extracted from a respective user input information respectively a further user input information at least partially based on one or more patterns (e.g. comprised or represented by a set of patterns). Such a pattern may for instance comprise such a pattern as "I/we am/are going to . . . ", to name but one non-limiting example. The final destination may for instance be extracted based on a sub-string following the "going to" indicator.

According to an exemplary embodiment of all exemplary aspects of the present invention, the method further comprises:

determining an optimal route information indicative of a route that the user is guided respectively navigated from a current user location.

Such an optimal route information may for instance be determined by utilizing a map to determine the route from the current user location (e.g. represented or comprised by the coarse position estimate) to an intended final destination of the user (e.g. represented or comprised by a respective location indication information).

According to an exemplary embodiment of all exemplary aspects of the present invention, the method further comprises:

determining one or more pieces of POI route information, wherein each respective POI route information of the one or more pieces of POI route information is indicative of an optimal route from a current user location to a Point-of-Interest comprised or represented by each location indication information of the one or more pieces of location indication information that are formed.

For instance, a list is generated of optimal routes from current user locations to the extracted POIs. There may for instance be several optimal routes for one POI. In this case, all of these several optimal routes comprised or represented by a respective POI route information may for instance be considered.

Given that e.g. K (K may for instance be a number of POIs) POIs are extracted and thus being represented or comprised by the one or more pieces of POI route information, a list of optimal routes from the current user location(s) to the extracted K POIs may for instance be generated. In case there are several or multiple optimal routes to get from the current user location to the POI location, all of them may for instance be considered.

According to an exemplary embodiment of all exemplary aspects of the present invention, the method further comprises:

determining a user track estimation based at least partially on the optimal route information.

The route comprising or representing one or more POIs that best matches one or more location of the user, and that e.g. are represented by one or more coarse position estimates subsequently determined or triggering to be determined (e.g. over a certain period of time) may for instance be the most likely route a user has taken.

This route that best matches the user locations (e.g. as represented by one or more coarse position estimates subsequently determined or triggering to be determined) may for instance be further used to improve user track estimation.

According to an exemplary embodiment of all exemplary aspects of the present invention, the method further comprises:

selecting the POI route information of the one or more pieces of POI route information that best matches a series of user location, wherein the user track estimation is determined further based on the selected POI route information.

The match can be measured by Euclidean distance between the locations and the route, i.e. sum of distances from location estimates to the closest corresponding points on the route.

The route that best matches the user locations can then be used to improve the user track estimation, e.g. by using such map matching methods, as described above.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 1 a schematic block diagram of a system according to an exemplary aspect of the present invention;

FIG. 2 a flowchart showing an example embodiment of a method according to the first exemplary aspect of the present invention;

FIG. 3a-3c flowcharts of example aspects that may for instance be performed and/or controlled in addition to flowchart 200 of FIG. 2;

DETAILED DESCRIPTION OF SOME EXEMPLARY EMBODIMENTS

Figure 3A:
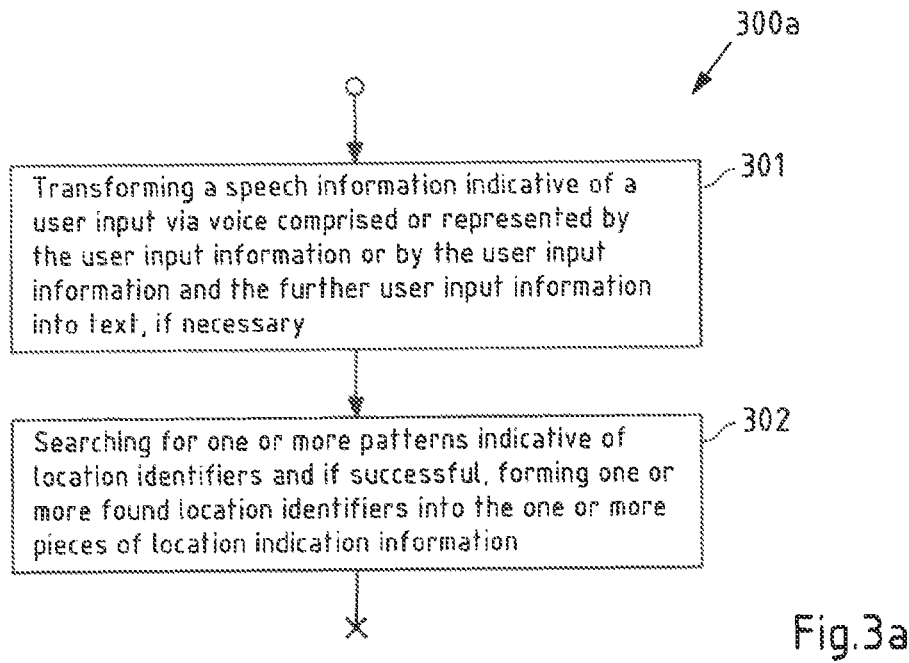

The following description serves to deepen the understanding of the present invention and shall be understood to complement and be read together with the description as provided in the above summary section of this specification.

FIG. 1 is a schematic high-level block diagram of a system 100 according to an example embodiment of the present invention.

Such a system 100 may for instance represent an architecture and/or environment that is/are configured, at least partially, to perform and/or control one or more aspects of the present invention.

System 100 comprises a server 110, an optional database 120, one or more mobile devices 130 (e.g. a smartphone, tablet, wearable, IoT-device; wherein in FIG. 1 only one single mobile device is exemplary shown), and one or more radio units 150 (from which two WiFi access points and/or BT and/or BLE beacons 150-1 and 150-2 are shown), and one or more satellites 170 (three satellites 170-1, 170-2, 170-3 are shown in FIG. 1).

The optional database 120 may for instance be comprised by or connectable to server 110. In case optional database 120 is comprised by server 110, server 110 and database 120 may form a single entity. The database 120 may for instance comprise a memory, e.g. for storing one or more coarse position estimates, one or more pieces of user input information, one or more pieces of location indication information, one or more position estimates, one or more pieces of further user input information, one or more pieces of further location indication information, one or more pieces of speech information, one or more patterns, one or more list of one or more Point-of-Interest names, one or more identifiers of one or more certain locations, one or more pieces of optimal route information, one or more pieces of POI route information, one or more user track estimations, or a combination thereof, to name but a few non-limiting examples.

System 100 may for instance further comprise a communication network 140. The communication network 140 may for instance be used for transmitting e.g. user input information, further user input information, position estimate(s), or a combination thereof between the server 110, the one or more mobile devices 130, and/or the one or more radio nodes 150. The communication network may for instance be the Internet and/or a cellular communication network, to name but a few non-limiting examples. It will be understood that communication network 140 may for instance be used for transmitting information between entities, devices, and/or units that are not explicitly shown in FIG. 1 and/or described within the meaning of the present invention. Alternatively, communication network 140 may for instance be configured to transmit information for the entities, devices and/or units that are explicitly shown in FIG. 1 and/or described within the meaning of the present invention.

The server 110 may alternatively be embodied as a server cloud (e.g. a plurality of servers connected, e.g. via the internet, and/or the communication network 140, and providing one or more services at least partially jointly). The server 110, which may for instance be embodied as a positioning respectively navigation server, may for instance be configured to provide e.g. one or more radio maps, and/or perform and/or control positioning requests to determine (e.g. estimate) one or more position estimates of one or more mobile devices (e.g. one or more mobile devices 130) to be determined (e.g. estimated, e.g. represented by one or more respective position estimates). The server 110 may for instance be connected to the one or more mobile devices 130, and/or to the one or more radio nodes 150 via a wirebound and/or wireless communication connection (e.g. according to the WiFi, BT, BLE, and/or ZigBee communication standard, to name but a few non-limiting examples). For instance, such wirebound and/or wireless communication connections may be enabled by the communication network 140.

Mobile device(s) 130, and radio nodes 150 may for instance be located within a venue 160, e.g. a building. Radio nodes 150 may for instance provide cellular and/or wireless communication services within the venue 160. Further, satellites 170 may for instance cover the venue 160 so that one or more signals sent (e.g. via broadcast) may for instance be receivable and/or observable e.g. at least outside of the venue 160.

Example embodiments according to all aspects of the present invention enable a method, e.g. a non-real time method for deducing location of the device based on the user text and/or speech input, and information about Places-of-Interest (POI).

When user speech or text input is detected, it is analyzed in order to detect specific location context. For example, user may indicate his/her presence in a specific location with the speech or text having the following pattern "I am in . . . now". The extracted name of the location can be further compared with the list of POI names existing in the neighborhood of the user coarse location (e.g. computed based on cellular/WiFi/GPS). If a match between the location name extracted from the speech/text and some POI name (e.g. the name of the building 160) is found, then user location at the time of speech/text input can be assumed to be at the location of the POI.

FIG. 2 is a flowchart 200 showing an example embodiment of a method according to the first exemplary aspect of the present invention. This flowchart 200 may for instance be performed by a server (e.g. server 110 of FIG. 1), and/or a mobile device (e.g. mobile device 130 of FIG. 1).

In a first step 201, a coarse position estimate is determined, or its determination is triggered. The coarse position estimate may for instance be determined based on GNSS-based positioning and/or non-GNSS-based positioning. A GNSS-based positioning may for instance be enabled by the satellites 170-1 to 170-3 of FIG. 1 being a part of a satellite system (such as GPS, GALILEO, GLONASS, to name but a few non-limiting examples). In case flowchart 200 is performed and/or controlled by mobile device 130 of FIG. 1, the mobile device 130 may for instance gather (e.g. measure) signals from the satellites 170-1 to 170-3 and/or from the radio nodes 150-1 to 150-2 of FIG. 1. Then the coarse position estimate can be determined by the mobile device 130. In case the flowchart 200 is performed and/or controlled by server 110 of FIG. 1, for instance the mobile device 130 may for instance gather (e.g. measure) signals from the satellites 170-1 to 170-3 and/or from the radio nodes 150-1 to 150-2 of FIG. 1, which are then transmitted (e.g. via communication network 140 of FIG. 1) to the server 110, which is in this way triggered (by the mobile device 130 of FIG. 1) to determine the coarse position estimate. Of course, in this latter case, server 110 of FIG. 1 can continue to execute the further steps of the flowchart, e.g. step 202*a*. Alternatively, the coarse position estimate may for instance be output to the mobile device 130 of FIG. 1, which can then continue with the execution of step 202*a*.

In a second step 202*a*, user input information is obtained. The user input information may for instance be obtained by gathering input a user has entered into his mobile device, e.g. mobile device 130 of FIG. 1. Such input the user has entered may for instance be text inputted e.g. via a keyboard, keypad, or a touchscreen. Further, such input a user has entered into his mobile device may for instance be voice (e.g. via a microphone) captured as a speech information.

In a third step 203*a*, the user input information of step 202*a* is analyzed. The analyzing may result in one or more pieces of location indication information indicative of one or more POI names or publically known venues, to name but a few non-limiting examples.

In a fourth step 204, the coarse position estimate is compared with the one or more pieces of location indication information.

In a fifth step, the result of the comparison of step 204 is checked. It is checked whether or not the coarse position estimate matches at least one of the one or more pieces of location indication information. Additionally or alternatively, for instance in case the coarse position estimate does not match at least one of the one or more pieces of location indication information, it may (e.g. further) be checked whether or not the location represented by the coarse position estimate is in the vicinity of at least one of the location represented by the one or more pieces of location indication information.

If the coarse position estimate does not match or is in the vicinity of a respective location indication information, it may for instance be continued with step 202*b*. In the optional step 202*b*, one or more further pieces of user input information are obtained, in the same way as the user input information of step 202*a*. Then, those further user input information may be analyzed (step 203*b*) in the same way as already performed with the user input information in step 203*a*. After steps 202*b* and 203*b* are performed, it may be continued with another iteration of step 204. It will be understood that another check in step 205 may for instance be performed, and steps 202*b* and 203, and followed by steps 204 and 205 (as described above) may for instance be executed multiple times.

In case the checking performed in step 205 leads to a positive result, thus a respective location indication information matches or is in the vicinity of the coarse position estimate, it may for instance be continued with executing step 206.

In step 206, a position estimate is determined. The position estimate is determined to represent or comprise the position of the respective location indication information. Since the likelihood that a user is located at the location as represented or comprised by the respective location indication that was checked in step 205 is relatively high compared to not utilizing user input information (step 202*a*) and/or further user input information (step 202*b*), the position estimate can be assumed to be more accurate than the coarse position estimate determined in step 201.

In an optional step 207, the position estimate (determined in step 206) is output. The position estimate may for instance be output to the mobile device 130 of FIG. 1 in case flowchart 200 is performed and/or controlled by server 110 of FIG. 1. Alternatively, the position estimate may for instance be output to at least one of the radio nodes (e.g. via communication network 140 of FIG. 1), which transmits (e.g. relays) the position estimate to the mobile device 130 upon its reception. The position estimate may for instance be output via display means, e.g. in case the flowchart 200 is performed by the mobile device 130. In this latter case, the mobile device 130 may for instance have determined its location, and the output of the position estimate represents a (visual or acoustic) presentation of the result to the user, to name but a few non-limiting examples.

It will be understood that at least some of the steps 201 to 207 may for instance be performed and/or controlled by different entities. For instance, steps 202*a* and 202*b* may for instance be performed and/or controlled by the mobile device 130 of FIG. 1, while the e.g. all of the other steps may for instance be performed and/or controlled by server 110 of FIG. 1.

FIG. 3*a* is a flowchart 300*a* showing an example embodiment of a method according to the first exemplary aspect of the present invention. This flowchart 300*a* may for instance be performed by a mobile device, e.g. mobile device 130 of FIG. 1. Alternatively, this flowchart 300*a* may for instance be performed by a server, e.g. server 110 of FIG. 1. The flowchart 300*a* may for instance be performed in addition to the flowchart 200 of FIG. 2. The steps 301 and 302 may for instance be part of the analyzing of the user input information (see step 203*a* of FIG. 2) and/or of the further user input information (see step 203*b* of FIG. 2).

In step 301, a speech information indicative of a user input via voice comprised or represented by the user input information or by the user input information and the further user input information into text. Such a speech information may for instance be obtained as user input information and/or further user input information in steps 202*a* respectively 202*b* of FIG. 2.

In step 302, one or more patterns are searched based on the transformed speech information, and/or the user input information and/or the further user input information in case the user input information and/or the further user input information comprises or represents text that can be searched while utilizing the one or more patterns. In the latter case, the user input information and/or the further user input information may for instance be obtained in step 202*a* respectively 202*b* already comprising or representing text.

Figure 3B:
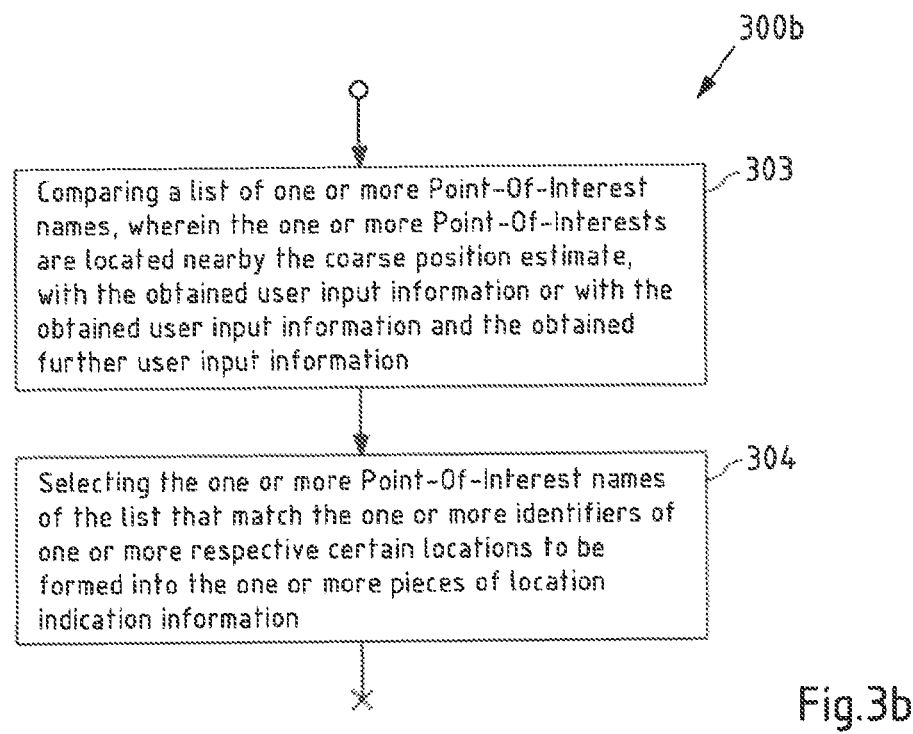

FIG. 3*b* is a flowchart 300*b* showing an example embodiment of a method according to the first exemplary aspect of the present invention. This flowchart 300*b* may for instance be performed by a mobile device, e.g. mobile device 130 of FIG. 1. Alternatively, this flowchart 300*b* may for instance be performed by a server, e.g. server 110 of FIG. 1. The flowchart 300*b* may for instance be performed in addition to the flowchart 200 of FIG. 2, or further in addition to flowchart 300*a* of FIG. 3*a*. The steps 303 and 304 may for instance be part of the analyzing of the user input information (see step 203*a* of FIG. 2) and/or of the further user input information (see step 203*b* of FIG. 2) for forming one or more pieces of location indication information and/or for forming one or more further pieces of location indication information.

In step 303, a list of one or more Point-Of-Interest names is compared with the obtained user input information (see step 202*a* of FIG. 2) and/or with the obtained further user input information (see step 202*b* of FIG. 2).

In step 304, one or more Point-Of-Interest names of the list that match the one or more identifiers of one or more respective certain locations to be formed into the one or more pieces of location indication information are selected.

The checking performed and/or controlled in step 205 of FIG. 2 may for instance be based on a requirement that the coarse position estimate needs to be closer to a respective location as represented or comprised by a respective location indication information. Thus, the comparison of step 303 may for instance be considered to be a rough vicinity criterion, while the comparison of step 205 of FIG. 2 may for instance be considered to be fine vicinity criterion.

FIG. 3*c* is a flowchart 300*c* showing an example embodiment of a method according to the first exemplary aspect of the present invention. This flowchart 300*c* may for instance be performed by a mobile device, e.g. mobile device 130 of FIG. 1. Alternatively, this flowchart 300*c* may for instance be performed by a server, e.g. server 110 of FIG. 1. The flowchart 300*c* may for instance be performed in addition to the flowchart 200 of FIG. 2, or further in addition to at least one of the flowcharts 300*a* of FIGS. 3*a*, and 300*b* of FIG. 3*b*. The steps 305 to 308 may for instance be performed subsequent to step 205 of FIG. 2, or subsequent to step 206 of FIG. 2, or subsequent to optional step 207 of FIG. 2.

In step 305, an optimal route information is determined.

In step 306, one or more pieces of POI route information are determined, wherein each respective POI route information of the one or more pieces of POI route information is indicative of an optimal route from a current user location to a Point-of-Interest comprised or represented by each location indication information of the one or more pieces of location indication information that are formed.

In step 307, a user track estimation is determined based at least partially on the optimal route information.

In step 308, the POI route information of the one or more pieces of POI route information that best matches a series of user location is selected, wherein the user track estimation is determined further based on the selected POI route information.

For instance, the intended final destination may be used as a user input information (e.g. represented or comprised by the user input information or the further user input information). When user speech/text comprised or represented by the user input information respectively the further user input information indicates his/her final destination, then most probable route(s) (e.g. comprised or represented by the user input information respectively the further user input information) from user current location can be determined, e.g. by obtaining it from the map and using this information to improve position estimate determining. Further, given other location data e.g. from GPS and inertial sensors, user track estimation (see step 307) may be improved by matching the track to one of the probable routes to the final destination indicated by the user (see step 308). Details of the steps 305 to 308 may for instance be as follows:

i) Detect text with location context as described above, by searching for the strings from the pre-defined set of patterns. The set of patterns may contain such patterns as:
"I am going to . . . "
"We are going to . . . "

ii) Estimate coarse user location. This can be done based on GNSS/WiFi/cellular positioning methods.

Extract a list of POIs in the relative proximity to the user coarse location, e.g. within M kilometers from the user coarse location.

iii) Given K POIs extracted at step ii), generate list of optimal routes from current user locations to the extracted POIs. Note, there may be several optimal routes for one POI, consider all of them.

iv) Choose the route that best matches the series of user locations. The match can be measured by Euclidean distance between the locations and the route, i.e. sum of distances from location estimates to the closest corresponding points on the route.

v) The route that best matches the user location data can be further used to improve user track estimation.

Figure 4:
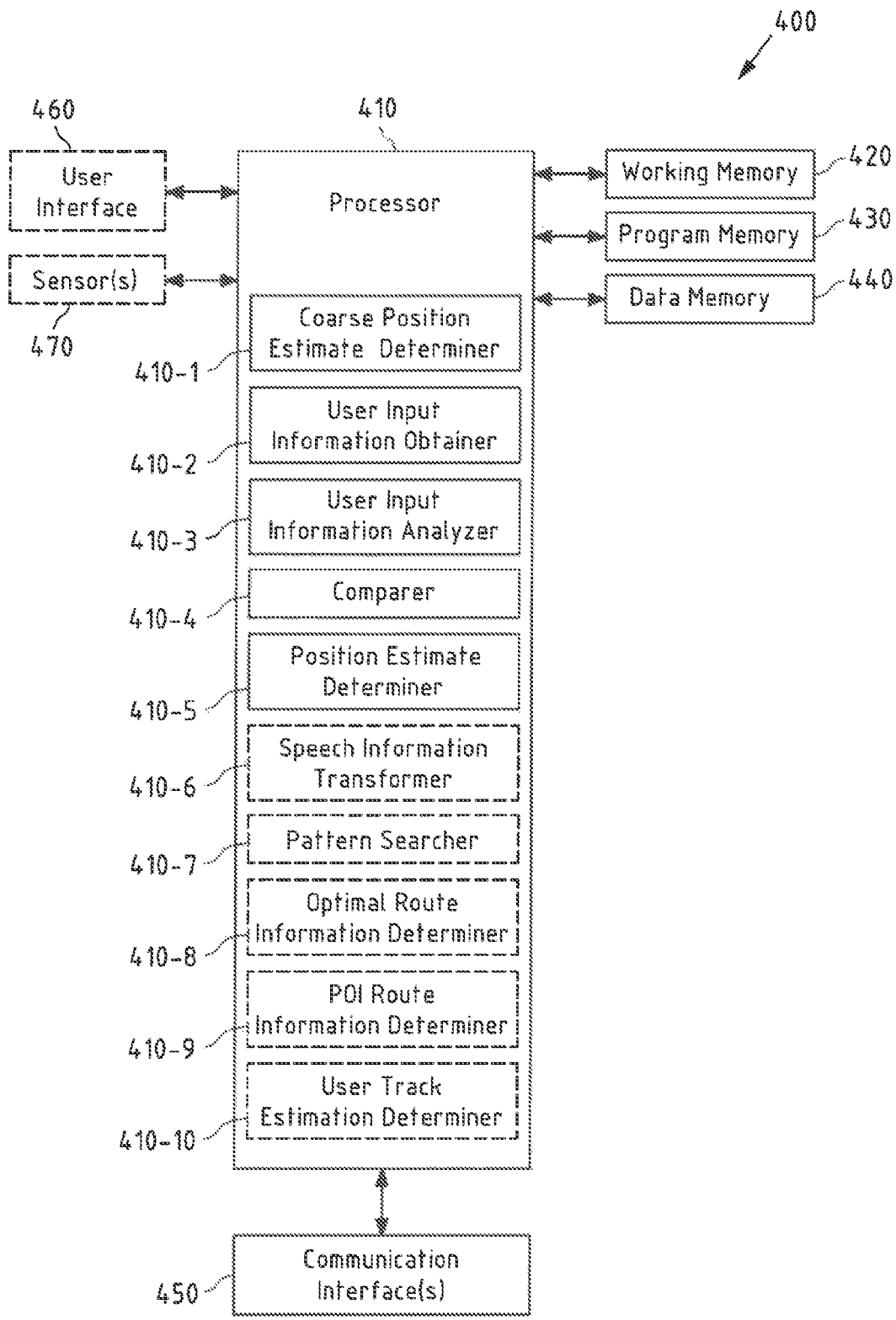
FIG. 4 a schematic block diagram of an apparatus configured to perform the method according to the first exemplary aspect of the present invention.

FIG. 4 is a schematic block diagram of an apparatus 400 according to an exemplary aspect of the present invention, which may for instance represent the mobile device 130 of FIG. 1. Alternatively, the schematic block diagram of the apparatus 400 according to an exemplary aspect of the present invention may for instance represent server 110 of FIG. 1.

Apparatus 400 comprises a processor 410, working memory 420, program memory 430, data memory 440, communication interface(s) 450, an optional user interface 460 and an optional sensor(s) 470 in case the apparatus 400 represents the mobile device.

Apparatus 400 may for instance be configured to perform and/or control or comprise respective means (at least one of 410 to 470) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise coarse position estimate determiner 410-1 as a functional and/or structural unit. Coarse position estimate determiner 410-1 may for instance be configured to determine a coarse position estimate or may be triggered for a determination of a coarse position estimate (see step 201 of FIG. 2).

Processor 410 may for instance comprise a user input information obtainer 410-2 as a functional and/or structural unit. User input information obtainer 410-2 may for instance be configured to obtain user input information and/or further user input information (see step 202a and/or 202b of FIG. 2).

Processor 410 may for instance comprise a user input information analyzer 410-3 as a functional and/or structural unit. User input information analyzer 410-3 may for instance be configured to analyze user input information and/or further user input information (see step 203a and/or 203b of FIG. 2).

Processor 410 may for instance comprise a comparer 410-4 as a functional and/or structural unit. Comparer 410-4 may for instance be configured to compare a coarse position estimate with one or more pieces of location indication information or a list of one or more Point-of-Interest names with user input information and/or further user input information (see step 204 of FIG. 2 and/or step 303 of FIG. 3b).

Processor 410 may for instance comprise a position estimate determiner 410-5 as a functional and/or structural unit. Position estimate determiner 410-5 may for instance be configured to determine a position estimate (see step 206 of FIG. 2).

Processor 410 may for instance comprise an optional speech information transformer 410-6 as a functional and/or structural unit. Speech information transformer 410-6 may for instance be configured to transform a speech information into a text information (e.g. string) (see step 301 of FIG. 3a).

Processor 410 may for instance comprise an optional pattern searcher 410-7 as a functional and/or structural unit. Pattern searcher 410-7 may for instance be configured to search for one or more patterns indicative of location identifiers (see step 302 of FIG. 3a).

Processor 410 may for instance comprise an optional optimal route information determiner 410-8 as a functional and/or structural unit. Optimal route information determiner 410-8 may for instance be configured to determine an optimal route information (see step 305 of FIG. 3c).

Processor 410 may for instance comprise an optional POI route information determiner 410-9 as a functional and/or structural unit. POI route information determiner 410-9 may for instance be configured to determine a POI route information determiner (see step 306 of FIG. 3c). Processor 410 may for instance comprise an optional user track estimation determiner 410-10 as a functional and/or structural unit. User track estimation determiner 410-10 may for instance be configured to determine a user track estimation (see step 307 of FIG. 3c).

Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more coarse position estimates, one or more pieces of user input information, one or more pieces of location indication information, one or more position estimates, one or more pieces of further user input information, one or more pieces of further location indication information, one or more pieces of speech information, one or more patterns, one or more list of one or more Point-of-Interest names, one or more identifiers of one or more certain locations, one or more pieces of optimal route information, one or more pieces of POI route information, one or more user track estimations, or a combination thereof, to name but a few non-limiting examples.

Communication interface(s) 450 enable apparatus 400 to communicate with other entities, e.g. with server 110 of FIG. 1 in case apparatus 400 represents a mobile device (e.g. mobile device 130 of FIG. 1), or vice versa. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with one of the radio nodes 150-1, 150-2 of FIG. 1 (see e.g. arrows illustrated in FIG. 1).

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information indicative of an absolute or relative altitude value, and/or a height with respect to a pre-determined baseline (e.g. above sea level). Sensor(s) 470 may for instance be comprised by apparatus 400, in case apparatus 400 represent a mobile device (e.g. mobile device 130 of FIG. 1).

Some or all of the components of the apparatus 400 may for instance be connected via a bus. Some or all of the components of the apparatus 400 may for instance be combined into one or more modules.

Figure 5:
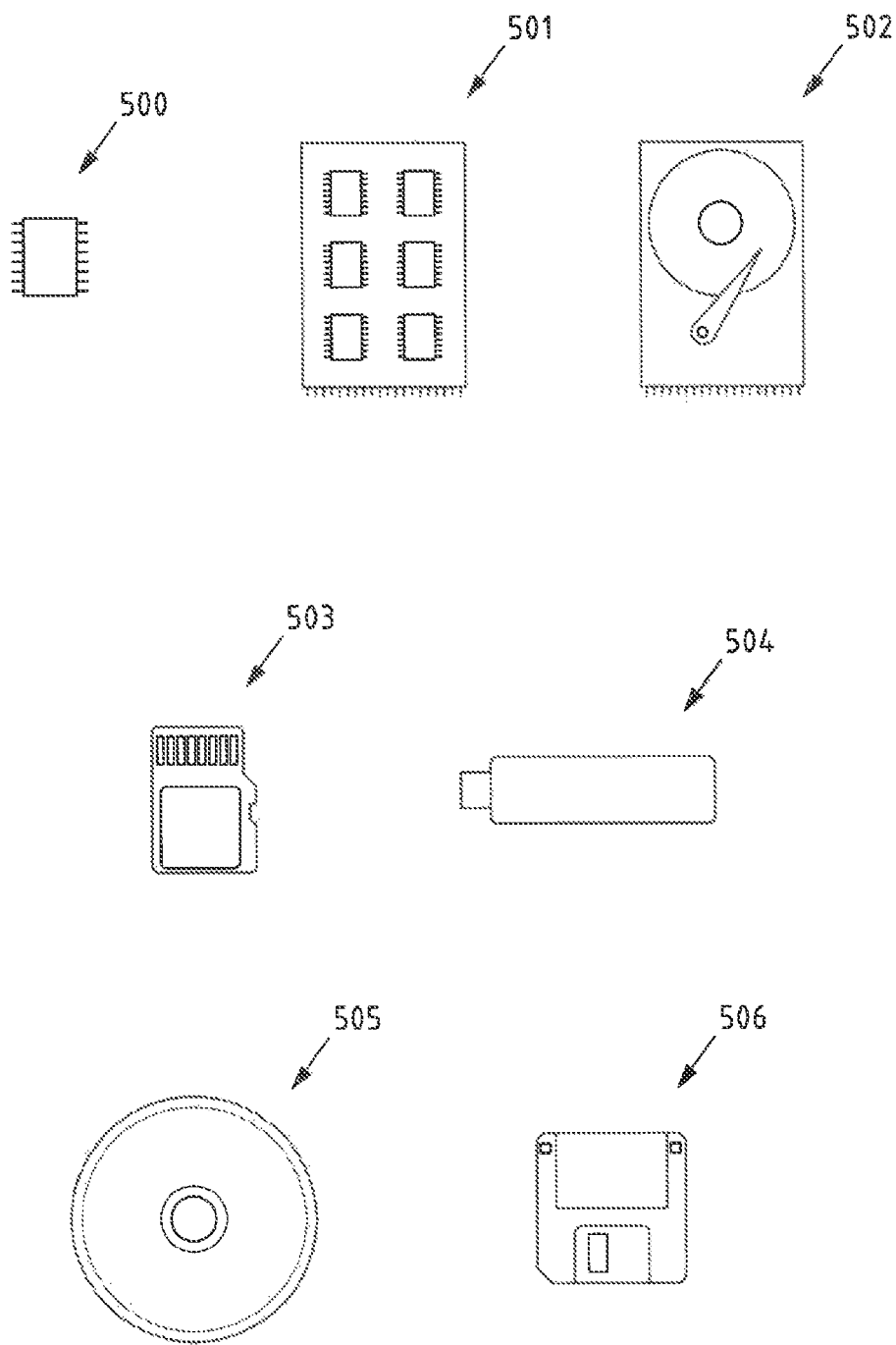
FIG. 5 a schematic illustration of examples of tangible and non-tangible storage media according to the present invention.

FIG. 5 is a schematic illustration of examples of tangible and non-transitory computer-readable storage media according to the present invention that may for instance be used to implement one or more of the memories 420, 430 of FIG. 4. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 410 of FIG. 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

The following embodiment shall also be considered to be disclosed and may for instance consist of the following steps:
1) Regularly obtain speech/text user input, and transform it to a text form, if necessary;
2) Detect text patterns containing user location context and extract corresponding location names;
3) Estimate user coarse location based on GPS/cellular/WiFi/BT/BLE;
4) Compare location names extracted in the detection step (step 2))with the list of POI names located nearby the user; and
5) Assign the location of the matched POI as the location of the user at the time of speech/text input.

These steps 1) to 5) are described in more detail below:

Step 1): Mobile device is constantly receiving voice or text input from the user. Voice can be converted to the text input using speech to text methods (e.g. known from the prior art). In such a way, both speech and text data are sent to further processing steps in the text form.

Step 2): detection of text with location context can be done by searching for the strings from the pre-defined set of patterns. The set of patterns may contain such patterns as:
"I/We am/are in/at/on . . . now"
"I/We am/are in/at/on . . . "
. . .
The actual list of patterns may contain much more patterns. Additionally, there may be different sets of patterns representing different languages, to be able to process multilingual speech/text. Extract the location name from the pattern containing location context. This is done by extracting the sub-string following "in/at/on" from the user text.

Also, it is possible to use Natural Language Processing (NLP) methods for detection of location context, and corresponding location names.

Step 3): Estimate coarse user location. This can be done based on GNSS/WiFi/cellular positioning methods. Extract a list of POIs nearby the user coarse location, e.g. within M meters from the user coarse location. POI information is available e.g. from online third party provides, e.g. retrievable via an API (Application Programming Interface).

Step 4): Compare the location name extracted in step 2) with the POI names extracted at step 3). The result of the comparison is the list of probabilities that extracted location name represents the POI. If strings representing POI name and the extracted location name completely match and are sufficiently long and unique, then probability is 1. If the strings do not match, then probability is 0. There are also intermediate cases, e.g. when one is short variant of the other, e.g. "Mac" and "MacDonalds", in which case the probability is between 0 and 1.

Step 5): choose K POIs with the highest probabilities according to the result of step 4). Estimate user location based on the locations of the K chosen POIs. For example, user location can be estimated as the mean of POIs' locations (can also be weighted based on the probabilities). In case K=1, user location is estimated based on best matched POI.

The estimated location corresponds to the time of the initial speech/text input, and can be further used for geo-tagging. For example, it can be used to geo-tag a WiFi/BT/BLE measurement made approximately (e.g. within 1-5 seconds) at the time of speech/text input. Resulting radio fingerprints (geo-referenced radio scans) are extremely important for generating radio maps indoors, such as e.g. shopping malls, airports, university buildings, or the like.

In this way, a method is enabled that provides additional means for device localization in indoor environments. Potentially improves indoor positioning in very popular use case and frequency visited locations. The method according to the first exemplary aspect of the present invention can also be run offline to reduce the computation burden in the device. However, the efficiency of the method is dependent upon the density of POIs located in this area. Thus, public areas mostly have a larger number of POIs with unique names (e.g. shopping malls) than rural areas.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
   determining or triggering a determination of a coarse position estimate based on Global Navigation Satellite System (GNSS)-based and/or non-GNSS-based positioning;
   obtaining user input information indicative of one or more inputs a user has entered into a mobile device;
   analyzing the user input information for forming one or more pieces of location indication information, wherein a respective location indication information is indicative of an identifier of a certain location;
   comparing the coarse position estimate with the one or more pieces of location indication information; and
   in case a respective location indication information matches or is in the vicinity of the coarse position estimate, determining a position estimate to represent or comprise the position of the respective location indication information.

2. The method according to claim 1, wherein the comparing further comprises:
   determining a time difference between a first time at which the user input information was gathered prior to the obtaining of the user input information and a second time at which the comparing is performed, and wherein the position estimate is determined to represent or comprise the position of the respective location indication information in case the time difference is equal or smaller than a pre-defined amount of time.

3. The method according to claim 1, wherein in case a respective location indication information does not match or is not in the vicinity of the coarse position estimate, further comprising:
   obtaining further user input information; and
   analyzing the further user input information for forming one or more further pieces of location indication information, wherein the comparison is based on the coarse position estimate and the one or more further pieces of location indication information.

4. The method according to claim 1, wherein the user input information or the user input information and the further user input information are continuously gathered.

5. The method according to claim 1, wherein the user input information or the user input information and the further user input information are gathered by the mobile device, in particular by a microphone or an input device comprised by or connectable to the mobile device.

6. The method according to claim 1, wherein the analyzing of the user input information further comprises:
   transforming a speech information indicative of a user input via voice comprised or represented by the user input information or by the user input information and the further user input information into text, if necessary; and
   searching for one or more patterns indicative of location identifiers and if successful, forming one or more found location identifiers into the one or more pieces of location indication information.

7. The method according to claim 1, wherein the coarse position information is determined at least partially based on sensor-based measurements, in particular based on Global Positioning System (GPS) sensor-based and/or radio-based measurements.

8. The method according to claim 1, wherein the forming of the one or more pieces of location indication information further comprises:
   comparing a list of one or more Point-Of-Interest names, wherein the one or more Point-Of-Interests are located nearby the coarse position estimate, with the obtained user input information or with the obtained user input information and the obtained further user input information; and
   selecting the one or more Point-Of-Interest names of the list that match the one or more identifiers of one or more respective certain locations.

9. The method according to claim 1, wherein at least one of the one or more pieces of location indication information comprises or represents a route destination information indicative of a final destination to which the user is navigated.

10. The method according to claim 9, further comprising:
    determining an optimal route information indicative of a route that the user is guided respectively navigated from a current user location.

11. The method according to claim 9, further comprising:
    determining one or more pieces of Point-of-Interest (POI) route information, wherein each respective POI route information of the one or more pieces of POI route information is indicative of an optimal route from a current user location to a Point-of-Interest comprised or represented by each location indication information of the one or more pieces of location indication information that are formed.

12. The method according to claim 10, further comprising:
    determining a user track estimation based at least partially on the optimal route information.

13. The method according to claim 12, further comprising:
    selecting the POI route information of the one or more pieces of POI route information that best matches a series of user locations, wherein the user track estimation is determined further based on the selected POI route information.

14. An apparatus comprising at least one processor and at least one memory including computer program code, the at least one memory and the computer program code configured to, with the at least one processor, cause the apparatus at least to perform:
    determine or trigger a determination of a coarse position estimate based on Global Navigation Satellite System (GNSS)-based and/or non-GNSS-based positioning;
    obtain user input information indicative of one or more inputs a user has entered into a mobile device;
    analyze the user input information for forming one or more pieces of location indication information, wherein a respective location indication information is indicative of an identifier of a certain location;
    compare the coarse position estimate with the one or more pieces of location indication information; and
    in case a respective location indication information matches or is in the vicinity of the coarse position estimate, determine a position estimate to represent or comprise the position of the respective location indication information.

15. The apparatus according to claim 14, wherein the at least one memory and the computer program code are configured to, with the at least one processor, cause the apparatus to compare the coarse position estimate with the one or more pieces of location indication information by determining a time difference between a first time at which the user input information was gathered prior to the obtaining of the user input information and a second time at which the comparing is performed, and wherein the position estimate is determined to represent or comprise the position of the respective location indication information in case the time difference is equal or smaller than a pre-defined amount of time.

16. The apparatus according to claim 14, wherein in case a respective location indication information does not match or is not in the vicinity of the coarse position estimate, the at least one memory and the computer program code are further configured to, with the at least one processor, cause the apparatus to:
    obtain further user input information; and
    analyze the further user input information for forming one or more further pieces of location indication information, wherein the comparison is based on the coarse position estimate and the one or more further pieces of location indication information.

17. The apparatus according to claim 14, wherein the at least one memory and the computer program code are configured to, with the at least one processor, cause the apparatus to analyze the user input information by:
    transforming a speech information indicative of a user input via voice comprised or represented by the user input information or by the user input information and the further user input information into text, if necessary; and
    searching for one or more patterns indicative of location identifiers and if successful, forming one or more found location identifiers into the one or more pieces of location indication information.

18. The apparatus according to claim 14, wherein the at least one memory and the computer program code are configured to, with the at least one processor, cause the apparatus to form the one or more pieces of location indication information by:
    comparing a list of one or more Point-Of-Interest names, wherein the one or more Point-Of-Interests are located nearby the coarse position estimate, with the obtained user input information or with the obtained user input information and the obtained further user input information; and
    selecting the one or more Point-Of-Interest names of the list that match the one or more identifiers of one or more respective certain locations.

19. The apparatus according to claim 14, wherein at least one of the one or more pieces of location indication information comprises or represents a route destination information indicative of a final destination to which the user is navigated.

20. A non-transitory computer-readable storage medium storing computer program code that is configured, upon execution, to:
    determine or trigger a determination of a coarse position estimate based on Global Navigation Satellite System (GNSS)-based and/or non-GNSS-based positioning;
    obtain user input information indicative of one or more inputs a user has entered into a mobile device;
    analyze the user input information for forming one or more pieces of location indication information, wherein a respective location indication information is indicative of an identifier of a certain location;

compare the coarse position estimate with the one or more pieces of location indication information; and in case a respective location indication information matches or is in the vicinity of the coarse position estimate, determine a position estimate to represent or comprise the position of the respective location indication information.

\* \* \* \* \*